United States Patent
Quindt et al.

(10) Patent No.: US 11,097,752 B2
(45) Date of Patent: Aug. 24, 2021

(54) HEAT SINK COVER AND ELECTRICALLY OPERATED VEHICLE

(71) Applicant: Siemens Mobility GmbH, Munich (DE)

(72) Inventors: Juergen Quindt, Roethenbach an der Pegnitz (DE); Arnd Rueter, Krefeld (DE); Johannes Blisse, Spardorf (DE)

(73) Assignee: Siemens Mobility GmbH, Munich (DE)

( * ) Notice: Subject to any disclaimer, the term of this patent is extended or adjusted under 35 U.S.C. 154(b) by 0 days.

(21) Appl. No.: 16/649,424

(22) PCT Filed: Sep. 27, 2018

(86) PCT No.: PCT/EP2018/076214
§ 371 (c)(1),
(2) Date: Mar. 20, 2020

(87) PCT Pub. No.: WO2019/063667
PCT Pub. Date: Apr. 4, 2019

(65) Prior Publication Data
US 2020/0239041 A1    Jul. 30, 2020

(30) Foreign Application Priority Data
Sep. 27, 2017 (DE) .................. 10 2017 217 228

(51) Int. Cl.
  *B61D 27/00* (2006.01)
  *B61C 3/00* (2006.01)
  (Continued)

(52) U.S. Cl.
  CPC .............. *B61D 27/009* (2013.01); *B61C 3/00* (2013.01); *B61C 17/04* (2013.01); *B61D 17/12* (2013.01); *H01C 1/08* (2013.01)

(58) Field of Classification Search
  CPC ...... B61D 27/00; B61D 27/009; B61D 17/12; B61C 3/00; B61C 17/04
  (Continued)

(56) References Cited

U.S. PATENT DOCUMENTS 2,289,910 A   7/1942 Hanson
4,840,221 A * 6/1989 Dumas .................... B61C 17/04
                                                    165/41

(Continued)

FOREIGN PATENT DOCUMENTS

CN   202254147 U   5/2012
CN   102892659 A   1/2013
(Continued)

*Primary Examiner* — Zachary L Kuhfuss
(74) *Attorney, Agent, or Firm* — Laurence Greenberg; Werner Stemer; Ralph Locher

(57) ABSTRACT

An electrically operated vehicle includes a braking resistor in a heat sink cover. The heat sink cover has an air throughflow body having vent openings and an air throughflow direction perpendicular to a direction of travel of the vehicle. The heat sink cover includes an inlet flap on an air inflow side and an outlet flap on an air outflow side. An opening mechanism opens and closes the flaps. In the closed state, the flaps are oriented along the direction of travel and obliquely to the air throughflow direction. In a plan view of the vent openings, the vent openings are at least 90% covered by the flaps in the closed state and at most 60% covered by the flaps in the opened state. The flaps are disposed symmetrically to a vehicle center axis, and the vent openings are oriented parallel to side surfaces of the vehicle.

12 Claims, 4 Drawing Sheets

(51) Int. Cl.
*B61D 17/12* (2006.01)
*H01C 1/08* (2006.01)
*B61C 17/04* (2006.01)

(58) Field of Classification Search
USPC .......................................................... 454/84
See application file for complete search history.

(56) References Cited

U.S. PATENT DOCUMENTS

2015/0158504 A1* 6/2015 Do ....................... B61D 27/009
454/84
2016/0159373 A1* 6/2016 Nicolau ............. B61D 27/0072
62/241

FOREIGN PATENT DOCUMENTS

| | | |
|---|---|---|
| CN | 103264708 A | 8/2013 |
| CN | 103273935 A | 9/2013 |
| CN | 203681557 U | 7/2014 |
| DE | 69313749 T2 | 1/1998 |
| DE | 102010026337 A1 | 1/2012 |
| DE | 102013226719 A1 | 6/2015 |
| DE | 102015207442 A1 | 10/2016 |
| EP | 0578549 A1 * 1/1994 ............ B61H 11/10 |
| EP | 2078655 A1 | 7/2009 |
| JP | S6164567 A | 4/1986 |
| JP | 2012126351 A | 7/2012 |
| RU | 2381113 C1 | 2/2010 |
| WO | 2012011433 A1 | 1/2012 |
| WO | 2017060032 A1 | 4/2017 |

* cited by examiner

A)

B)

C)

HEAT SINK COVER AND ELECTRICALLY OPERATED VEHICLE

BACKGROUND OF THE INVENTION

Field of the Invention

A heat sink cover is provided. In addition, an electrically powered vehicle is provided.

The published application WO 2017/060032 A1 is directed to a method for operating a vehicle and to a vehicle.

In the published application DE 10 2010 026 337 A1, a rail vehicle with a motion wind-cooled braking resistor is described.

A method for temporarily increasing an air resistance of a rail vehicle having at least two vehicle bodies coupled to one another is disclosed in the published application DE 10 2013 221 551 A1.

The published application DE 10 2013 226 719 A1 is directed to a roof housing for rail vehicles.

SUMMARY OF THE INVENTION

One object to be achieved is that of providing a heat sink cover with which an efficient cooling is enabled and which has a reduced air resistance.

This object is achieved, inter alia, with a heat sink cover and with a vehicle having the features of the independent claims. Preferred developments are the subject matter of the dependent claims.

According to at least one embodiment, the heat sink cover is provided for a vehicle. The vehicle is preferably an electrically operated vehicle such as a train.

According to at least one embodiment, the heat sink cover comprises, or there are provided in or on the heat sink cover, one or more air throughflow bodies. In this regard, the heat sink cover can be conceived as a heat sink housing. Vent openings are provided in the at least one air throughflow body. The vent openings are provided for an air entry and for air outflow.

According to at least one embodiment, the air throughflow body has an air throughflow direction. It is possible that the air throughflow direction extends along a straight line, seen on average and with eddies disregarded. In particular, the air throughflow direction represents a connecting axis between two vent openings of the air throughflow body assigned to and opposite one another.

According to at least one embodiment, the air throughflow direction is oriented transversely to a direction of travel of the vehicle. In particular, the air throughflow direction is perpendicular to the direction of travel. It is thereby possible that the air throughflow direction and the direction of travel are oriented parallel to a base surface, in particular rails, on which the vehicle moves. This means that the direction of travel and the air throughflow direction can be, on average, horizontally oriented.

According to at least one embodiment, the heat sink cover comprises one or a plurality of inlet flaps and one or more outlet flaps. The at least one inlet flap is situated on an air intake side of the air throughflow body and the at least one outlet flap is situated on an air outflow side of the air throughflow body. On the air intake side, ambient air enters the air throughflow body and is blown out of the air throughflow body on the air outflow side. Corresponding vent openings of the air throughflow body are associated with the air outflow side and the air intake side. It is possible that during operation of the vehicle, the air outflow side and the air intake side swap roles, for example, dependent upon the direction of travel of the vehicle. Alternatively, the air outflow side and the air intake side are unchangeable over time.

According to at least one embodiment, the heat sink cover comprises one or more opening mechanism(s). The at least one opening mechanism is configured for opening and closing the inlet flap and the outlet flap. The opening mechanism functions, in particular, pneumatically, hydraulically and/or electrically.

According to at least one embodiment, in the closed state, the inlet flap and the outlet flap are oriented along the direction of travel of the vehicle. In other words, the longitudinal axes of the inlet flap and/or the outlet flap can be oriented parallel to the direction of travel. If a plurality of inlet flaps and/or outlet flaps are present, this preferably applies for the entirety of the inlet flaps and/or outlet flaps. That the inlet flap and the outlet flap are oriented, in the closed state, along the direction of travel of the vehicle can mean that no, or no significant, air resistance is generated by means of the inlet flap and the outlet flap. This means that external surfaces and/or the longitudinal axes of the inlet flap and the outlet flap can be oriented parallel to the direction of travel of the vehicle, for example, with a tolerance of no more than 20° or 5° or 1°.

According to at least one embodiment, the inlet flap and the outlet flap are oriented obliquely to the air throughflow direction. This applies, in particular, in the closed state of the inlet flap and the outlet flap.

According to at least one embodiment, seen in plan view, the vent openings are covered, in particular, in a direction parallel to the air throughflow direction, in the closed state, by at least 90% or 95% or completely by the respectively associated inlet flap and by the respectively associated outlet flap. A degree of covering of the sent openings, in the opened state, by the inlet flap and/or the outlet flap is preferably no more than 70% or 60% or 50% or 40%. It is possible that, in the open state, the vent openings are cleared by the inlet flap and/or the outlet flap.

In addition, an electrically powered vehicle is proposed. The vehicle comprises one or more of the heat sink covers, as described in relation to one or more of the aforementioned embodiments. Features of the vehicle are therefore also disclosed for the heat sink cover and vice versa.

According to at least one embodiment, the vehicle is electrically operated. This means, in particular, that the vehicle has an electric motor by means of which a driving force of the vehicle is generated for wheels of the vehicle. The electrically powered vehicle is, for example, a train, a tram or a partially or completely electrically operated road vehicle such as an automobile or a goods vehicle.

According to at least one embodiment, the vehicle has a vehicle roof. It is thereby possible that the vehicle roof is curved. The vehicle roof can be, on average, horizontally oriented.

According to at least one embodiment, the vehicle has one or more braking resistors. The at least one braking resistor is accommodated in the air throughflow body or there is a plurality of braking resistors accommodated in an air throughflow body or a plurality of braking resistors are accommodated distributed over a plurality of air throughflow bodies. The braking resistor is, in particular, a load resistor of a resistance brake which, during the generator operation of an electric motor, represents a load which loads and brakes the motor.

According to at least one embodiment, the inlet flap and the outlet flap are oriented symmetrically to a vehicle central axis. This means that, due to a mirroring at the vehicle central axis, the inlet flap can be geometrically represented by the outlet flap and vice versa. This applies, in particular, in respect of an outer contour of the inlet flap and of the outlet flap. The vehicle central axis preferably lies perpendicularly to the direction of travel and/or is oriented vertically. In particular, the vehicle central axis is a track axis and/or is situated centrally between wheels of the vehicle. The vehicle central axis can relate to an external contour of the vehicle.

According to at least one embodiment, the vent openings are oriented parallel to side surfaces of the vehicle with a tolerance of no more than 40° or 20° or 10 or 5°. The vent openings can be oriented on average vertically.

In at least one embodiment, the vehicle is electrically operated and comprises a vehicle roof and a braking resistor in or under or on the heat sink cover. The heat sink cover has an air throughflow body with vent openings and with an air throughflow direction transverse to a direction of travel of the vehicle and contains an inlet flap on an air intake side and an outlet flap on an air outflow side of the air throughflow body. At least one opening mechanism can be provided for opening and closing the inlet flap and the outlet flap. In the closed state, the inlet flap and the outlet flap are oriented along the direction of travel and obliquely to the air throughflow direction. Seen in plan view of the vent openings, they are covered by the inlet flap and the outlet flap in the closed state by at least 90% and in the open state by no more than 60%. The inlet flap and the outlet flap are preferably arranged symmetrically to a vehicle central axis and the vent openings are oriented parallel to side surfaces of the vehicle with a tolerance of no more than 40°.

The vehicle thus has, in particular, a motion-resistance optimized braking resistor which is mounted in the air throughflow body and/or forms the air throughflow body. The air throughflow body and/or the braking resistor have comparatively large hollow chambers which can increase a motion resistance. Thereby, in these hollow chambers where, in particular, heat exchangers and/or resistance elements are installed, due to the motion wind, a counter-force arises which leads to turbulence and thus to an increase of motion resistance. The throughflow direction conventionally lies in the direction of travel or contrary to the direction of travel. Such braking resistors or air throughflow bodies typically have no closures which prevent a penetration of motion wind during an inactivity. All regions have throughflow, in particular permanent throughflow. For example, sinkable air suction devices are used, having: a flow orientation in the direction of travel.

In the configuration described here, a throughflow direction of the braking resistors and/or of the air throughflow body is oriented 90° to the direction of travel. The braking resistors and/or the air throughflow bodies are covered with add-on parts. The regions on an air inlet and on an air outlet are closable by movable flaps. If required, the flaps are opened in order to enable a throughflow to the braking resistor and/or the air throughflow body. Inflow regions and outflow regions as well as bulkhead walls preferably optimize an air guidance and minimize disturbing noises. For this purpose, such bulkhead walls and/or wind deflectors are preferably situated on the air outlet side.

With the heat sink cover described herein, an increase in the efficiency of the train is possible since the motion resistance is reduced. An energy-efficient ventilation of the braking resistors is achieved since smaller ventilators with less capacity can be used, in comparison with a configuration without flaps. A lower acoustic perceptibility in the interior of the train and/or outside the train results. This is achieved, in particular, by means of the closable flaps for motion-resistance minimization which are associated with less disruption of an airflow round the train.

Overall, therefore, a more energy-efficient and quieter vehicle is achievable.

According to at least one embodiment, the inlet flap and/or the outlet flap each have a stationary lower part closer to the vehicle roof and a movable upper part further removed from the vehicle roof. The lower parts cover the vent openings as seen in plain view thereon, in particular, along the air throughflow direction, by at least 15% or 25% or 35% and/or by no more than 60% or 50% or 40%.

According to at least one embodiment, in the opened state, the upper parts are oriented obliquely to the vehicle roof. Thereby, the upper parts can form a ramp in the direction away from the vent openings to an upper edge of the lower parts facing away from the vehicle roof. Thereby, a flow through the air throughflow bodies is less disrupted by the flaps.

According to at least one embodiment, in the opened state, the inlet flap and/or the outlet flap uncover the vent opening by at least 90% or completely. This applies, in particular, in plan view seen along the air throughflow direction.

According to at least one embodiment, in the opened state, the inlet flap and/or the outlet flap extend parallel to vehicle roof with a tolerance of no more than 20° or 10° or 5° or 1°. This applies, in particular, for external surfaces of the inlet flap and/or the outlet flap. In other words, in the open state, the flaps can fit closely against the vehicle roof. This applies, in particular, if in the open state the flaps uncover the vent openings completely.

According to at least one embodiment, the vehicle, in particular the heat sink cover, has one or more bulkhead walls. The at least one bulkhead wall is preferably stationary. This means that in proper use, the bulkhead wall is not, or not significantly, moved.

According to at least one embodiment, the at least one bulkhead wall is oriented perpendicularly to the direction of travel with a tolerance of no more than 30° or 20° or 10° or 2°. In particular, the bulkhead walls lie perpendicularly to the direction of travel.

According to at least one embodiment, in the closed state of the inlet flap and/or of the outlet flap, the at least one bulkhead wall lies flush with an exterior and/or an interior of the inlet flap and/or the outlet flap. In other words, an edge of the bulkhead wall which faces away from the air throughflow body can extend along an outer contour of the heat sink cover. This applies particularly in a cross-section seen perpendicularly to the direction of travel.

According to at least one embodiment, a wind deflector is mounted on the bulkhead wall or on at least one of the bulkhead walls or on some of the bulkhead walls or on all the bulkhead walls. In the closed state of the inlet flap and the outlet flap, the wind deflector preferably does not extend therebeyond. This means that in the closed state of the flaps, the wind deflector can be retracted. It is possible that the wind deflectors are restricted to the air outflow side and/or are not operated on the air intake side. For example, the wind deflector is stored in the associated bulkhead wall able to be extended or folded out. This means that in the closed state of the flaps, the wind deflector can terminate flush with the bulkhead wall in the direction away from the air throughflow body.

According to at least one embodiment, in the open state of the inlet flap and/or of the outlet flap, the wind deflectors extend beyond the associated bulkhead wall and/or an external contour of the heat sink cover. This means that with the flaps open, the wind deflectors are extended, in particular only on the air outflow side.

According to at least one embodiment, the heat sink cover has one or more transition panels. The at least one transition panel delimits the heat sink cover on one side or on both sides, seen along the direction of travel. By means of the transition panels, a flow behavior is optimizable at a start and at an end of the heat sink cover, particularly as seen along the direction of travel. The transition panels preferably have their effect only with the flaps open. With the flaps closed, the transition panels preferably lie in the external contour of the heat sink cover and/or in a roof covering of the vehicle.

According to at least one embodiment, the transition panels narrow in the direction away from the vehicle roof and/or in the direction toward a center of the heat sink cover, in particular, continuously. This can apply in a plan view and/or in a side view of the vehicle.

According to at least one embodiment, the heat sink cover has one or more cover panels. The at least one cover panel which can be realized with a thin metal sheet or a thin plastics plate and is configured flat is preferably oriented parallel or approximately parallel to the vehicle roof. This applies, for example, with a tolerance of no more than 20° or 10° or 5° or 2°. The cover panels are preferably stationary and rigid, but alternatively can also be mounted in a movable manner and also move when the flaps are opened and/or closed.

According to at least one embodiment, the at least one cover panel extends beyond the associated vent openings in the direction away from the air throughflow body on a side facing away from the vehicle roof. In other words, the cover panel can represent a type of projecting roof of the associated went opening According to at least one embodiment, at least one fan is mounted in the air throughflow body. The one or more fans are configured for generating an airflow through the air throughflow body so that by means of the airflow a cooling of the braking resistor takes place. In other words, the air throughflow direction is defined by means of the fans. An air throughflow of the air throughflow body is thus preferably actually dependent upon the at least one fan and less or only subordinately or not significantly upon the movement of the vehicle it is possible that a motion direction and thus the air throughflow direction are adjustable by means of the fan, for example, dependent thereon whether the vehicle moves forward or backward.

According to at least one embodiment, in the closed state, the inlet flap and/or the outlet flap have a mean angle to the vehicle roof that has at least at 15° or 20 or 25° or 30°. Alternatively or additionally, this angle is no more than 60°, 50° or 40°. Seen in cross-section, this angle can relate alternatively or additionally to a horizontal line which extends on average parallel to the vehicle roof. The average angle relates, for example, seen in cross-section, to a chord of the flaps and/or of the vehicle roof.

According to at least one embodiment, the inlet flap and/or the outlet flap and optionally the at least one cover panel extend, along the direction of travel and/or transversely to the direction of travel, flush with the roof covering. This means that, in the closed state of the flaps, the heat sink cover appears, together with the roof covering, as a preferably smooth unstructured uniform surface extending parallel to the direction of travel. By this means, in the closed state of the flaps, a particularly low motion resistance is achieved.

According to at least one embodiment, the vehicle is a train. Particularly preferably, the train is provided for a maximum speed of at least 120 km/h or 220 km/h or 280 km/h. This means that the heat sink cover described here is used, in particular, in high speed trains in which the air resistance contributes significantly to an energy consumption during travel at high speeds.

The heat sink cover described herein and an electrically operated vehicle described herein will now be described in greater detail making reference to the drawings and using exemplary embodiments. The same reference characters indicate the same elements in the individual drawings. However, no scale references are disclosed, but rather individual elements may be illustrated excessively large for better understanding.

DETAILED DESCRIPTION OF THE INVENTION

Figure 1:
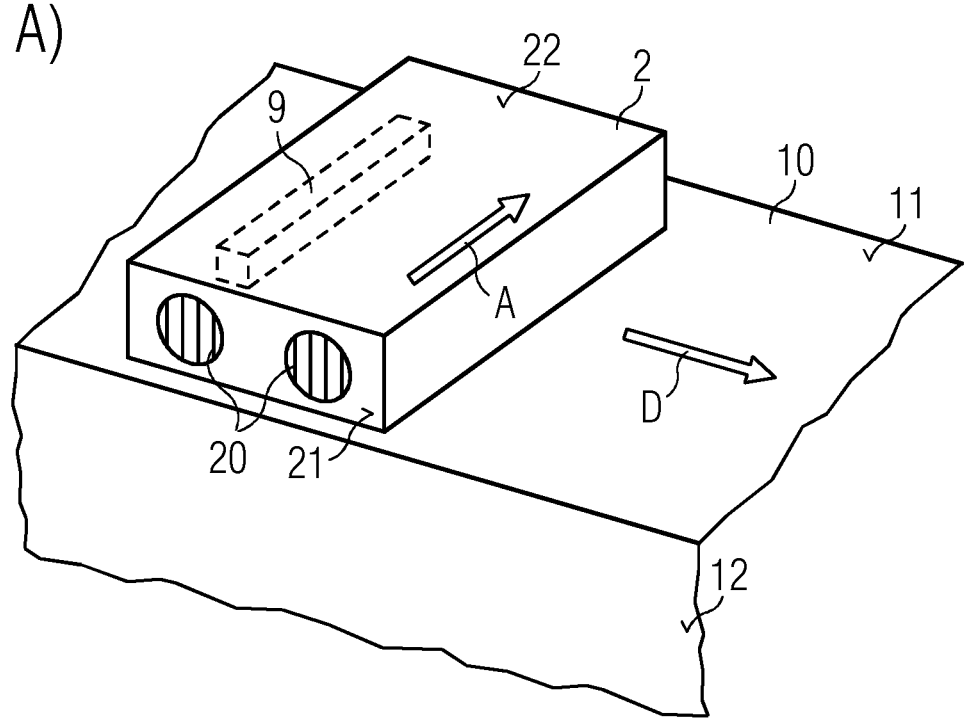
FIG. 1 shows a schematic perspective representation of air throughflow bodies for heat sink covers described here.
Figure 1:
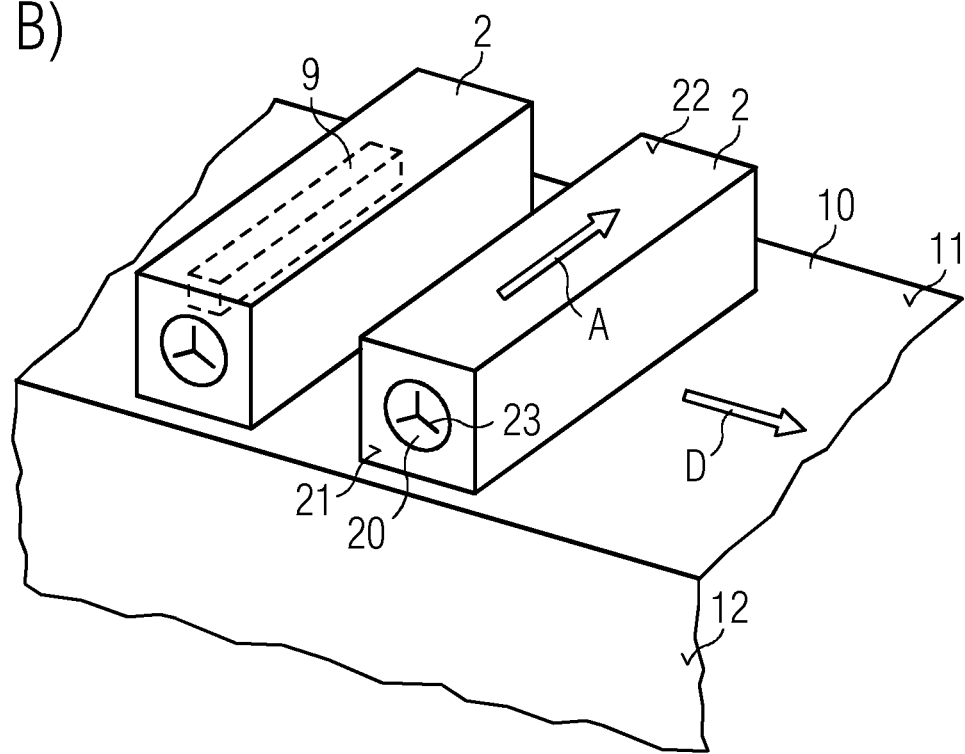

In FIG. 1A, an example of an air throughflow body 2 for an electrically operated vehicle 10 is shown. The air throughflow body 2 is situated on a vehicle roof 11 and has a plurality of vent openings 20 which are mounted on mutually opposite sides of the air throughflow body 2. In FIG. 1A, only the vent openings 20 on an air intake side 21 are shown, while the vent openings on an opposite air outflow side 22 are not visible.

Situated in the air throughflow body 2 are a plurality of braking resistors 9 of which only one is shown schematically by way of example. A cooling of the braking resistors 9 takes place by means of an airflow through the vent openings 20, specifically from the air intake side 21 to the air outflow side 22. By this means, an air throughflow direction A is defined which is oriented perpendicular to a direction of travel D of the vehicle 10.

The vent openings 20 are configured, for example, circular and can have a grille. Preferably, a plurality of the air throughflow bodies 2 are arranged along the direction of travel D beside one another, as distinct from the representation of FIG. 1A. This preferably also applies for all the other exemplary embodiments.

According to FIG. 1B, the air throughflow bodies 2 each have a fan 23 in order to drive the airflow along the air throughflow direction A. Thereby, in each air throughflow body 2, only two mutually opposed vent openings 20 can be provided.

A height of the air throughflow body 2 lies, for example, at least at 0.2 m and/or at least at 0.6 m, in particular at 0.4 m. The air intake sides 21 and the air outflow sides 22 are orientated approximately parallel to the side surfaces 12 of the vehicle. An extent of all the air throughflow bodies 2 of a heat sink cover 1 along the direction of travel D is, for example, 7.5 m. An overall length of the heat sink cover 1 is, for example, 8.2 m.

The configurations of the air throughflow bodies 2 as shown in FIGS. 1A and 1B can accordingly exist in all the other exemplary embodiments.

Figure 2:
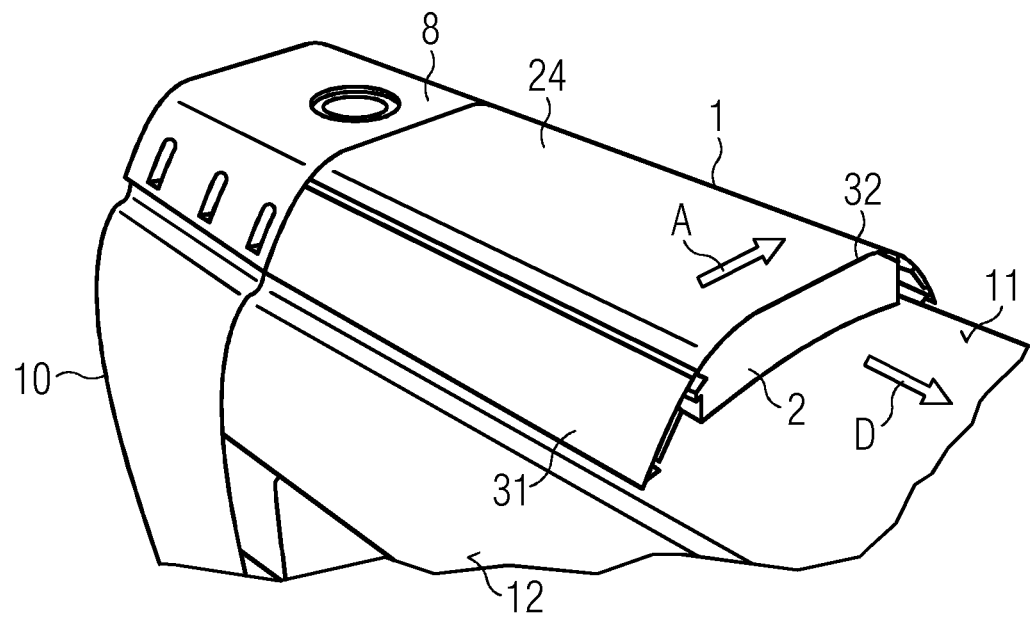
FIGS. 2 and 3 show schematic perspective representations of vehicles described herein with heat sink covers described herein.

It is schematically illustrated in FIG. 2 that the air throughflow bodies 2 are accommodated in the heat sink cover 1. The heat sink cover 1 optionally has a housing roof 24 which is oriented approximately parallel to the vehicle roof 11. Upper sides of the air throughflow bodies 2 can form part of the housing roof 24 or the housing roof 24 completely covers these upper sides.

Figure 3:
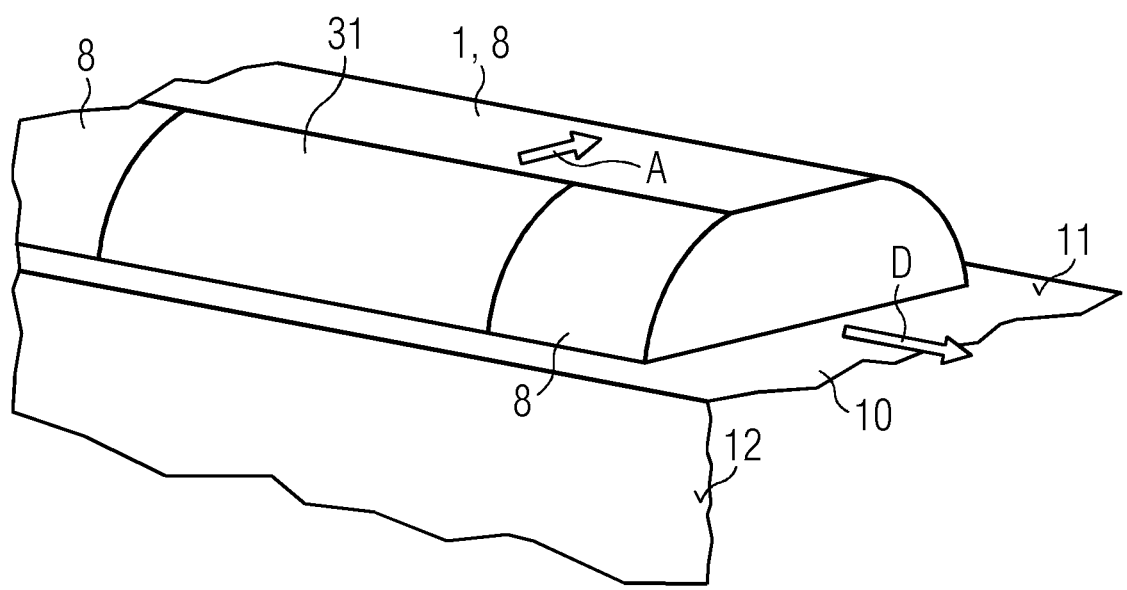

Thereby, both the vehicle roof 11, the optional housing roof 24 and the vehicle side surfaces 12 can be configured curved as seen in cross-section. Arranged laterally to and along the direction of travel D on the air throughflow bodies 2 are one or, preferably, a plurality of inlet flaps 31 and one or, preferably, a plurality of outlet flaps 32. The flaps 31, 32 together with the optional housing roof 24 join flush into the roof covering 8. The roof covering 8 continues, as distinct from that shown in FIG. 2, along the direction of travel D on both sides of the heat sink cover 1. This is additionally illustrated in FIG. 3. This means that in the closed state of the flaps 31, 32, the air throughflow bodies 2, possibly with the exception of their upper sides, are preferably entirely concealed and offer no wind drag surface.

Figure 4:
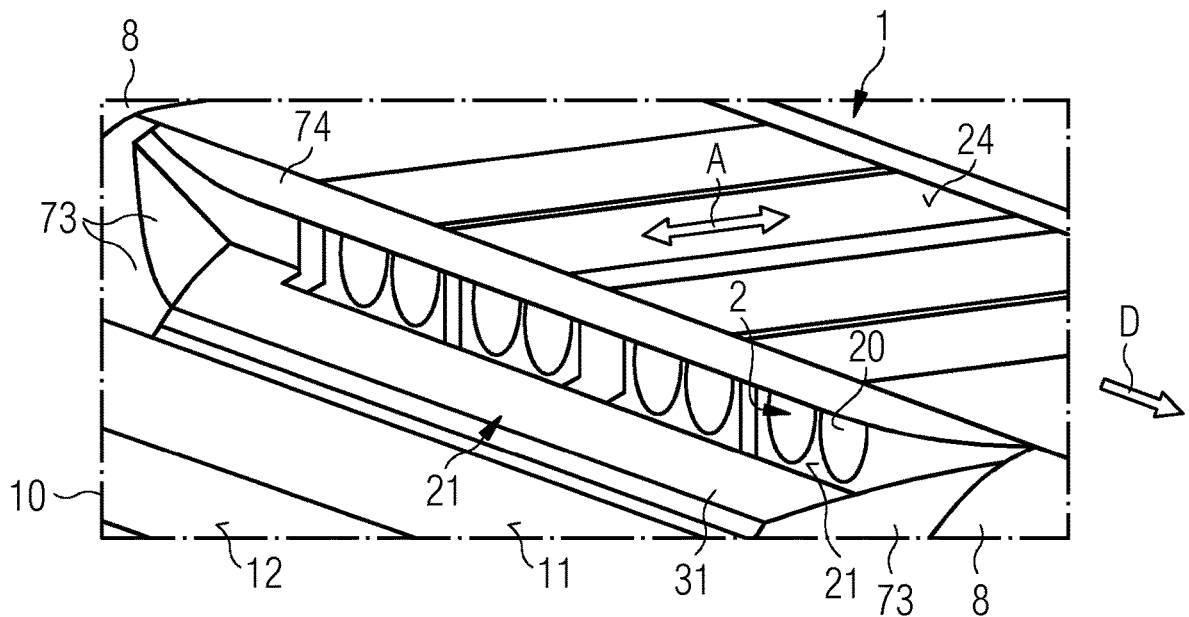
FIGS. 4 and 5 show schematic perspective representations of exemplary embodiments of heat sink covers described herein.

In FIG. 4, an example for the configuration on the air intake side 21 is shown. The air outflow side (not shown in FIG. 4) can be configured exactly the same. FIG. 4 shows the inlet flap 31 opened.

Beginning at the vehicle roof 11, the inlet flap 31 is folded in and extends, in the folded-in state, approximately parallel to the vehicle roof 11. The vent openings 20 are completely uncovered.

Optionally, a cover panel 74 is present. In the direction away from the air throughflow bodies 2, the cover panel 74 protrudes beyond the vent openings 20 in extension of the housing roof 24. At one end and at a start of the inlet flap 31 along the direction of travel D, the cover panel 74 preferably broadens. In relation to a spacing of an outer edge of the inlet flap 31 from the air throughflow body 2, the cover panel 24 has, for example, an extent of at least 10% or 20% and/or of no more than 40% or 30% of this spacing.

Furthermore, the heat sink cover 1 preferably has stationary transition panels 73 which are situated at a start and an end of the inlet flap 31. The transition panels 73 each narrow in the direction away from the vehicle roof 11 and in the direction away from the air throughflow bodies 2. Such transition panels 73 can also be present in all the other exemplary embodiments.

Figure 5:
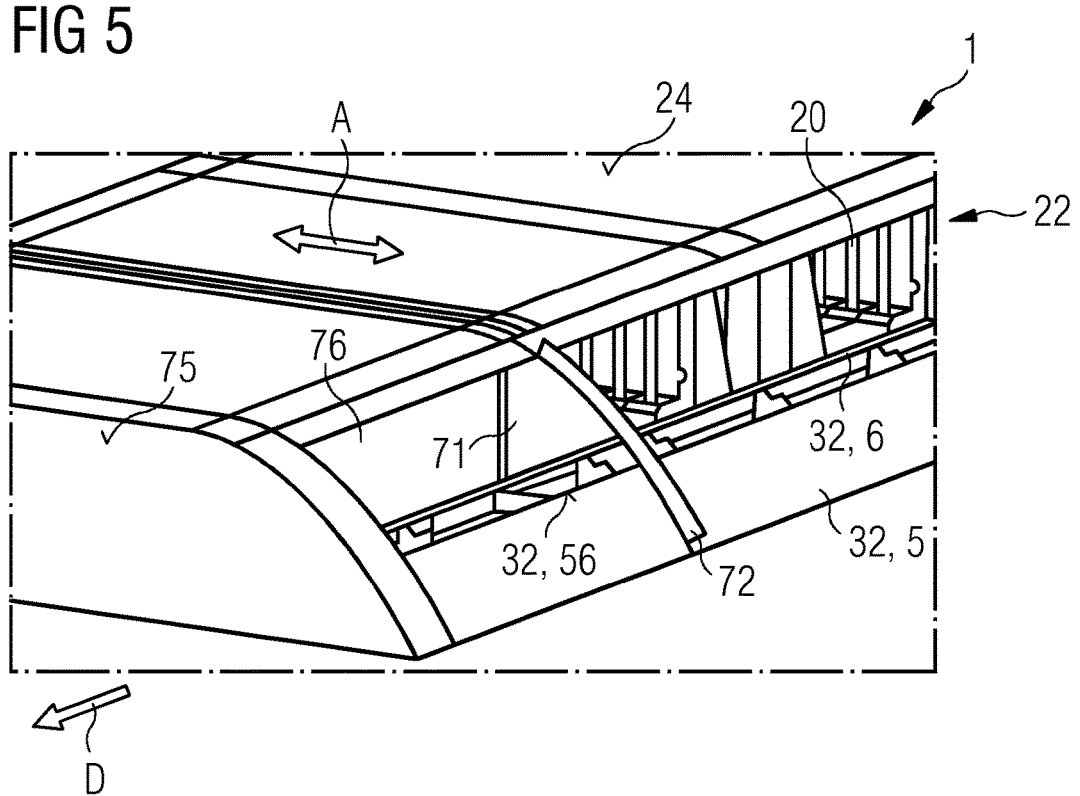

In FIG. 5, a further example of the heat sink cover 1 is illustrated by reference to the air outflow side 22. The air intake side (not shown) can be configured the same as the air outflow side 22, where not specified otherwise.

The outlet flap 32 has a lower part 5 and an upper part 6. The lower part 5 is stationary and, seen in cross-section, follows a contour of the roof covering (not shown in FIG. 5). On an upper edge 56, in the opened state, the upper part 6 bends away from the lower part 5 in the direction toward the vehicle roof. By this means, a ramp is temporarily formed by the upper part 6 in the direction away from the air throughflow body 2 (see also FIG. 7).

Optionally, one or more bulkhead walls 71 are present. The bulkhead walls 71 are oriented perpendicularly to the direction of travel D.

Figure 8:
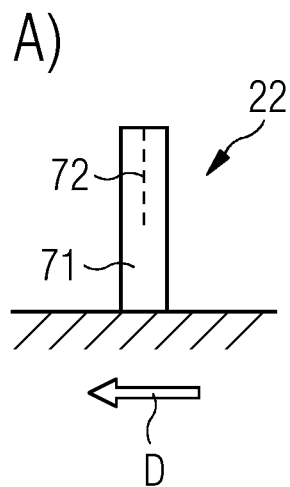
Figure 8:
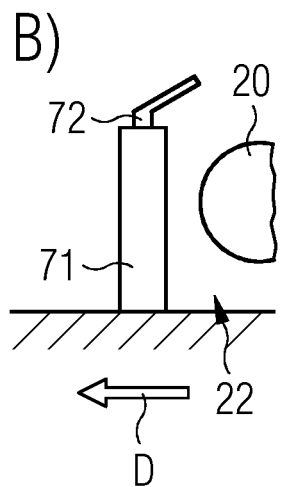
Figure 8:
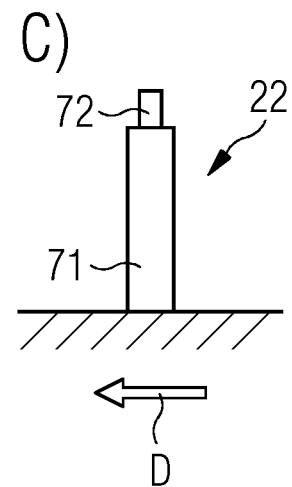

At least one wind deflector 72 can be arranged on the bulkhead walls 71 (see also FIG. 8). In the closed state of the outlet flap 32, the wind deflector 72 preferably does not extend beyond the associated bulkhead wall 71 (see FIG. 8A). With the outlet flap open 32, however, the wind deflector 72 extends beyond the associated bulkhead wall 71 (see FIGS. 8B and 8C). Thereby, the wind deflector 72 can extend straight in extension of the bulkhead wall 71 (see FIG. 8C). Alternatively, it is possible that the wind deflector 72 is angled against the direction of travel D (see FIG. 8B).

Preferably, such wind deflectors 72 are only activated on the air outflow side 22 and not on the air intake side 21.

By means of the bulkhead wall 71 together with the optional wind deflector 22, in the region of the vent openings 20, a flow vacuum is generated so that the air guided by the air throughflow bodies 2 can escape more easily from the vent opening 20 on the air outflow side 22.

Optionally, an empty chamber 76 is situated in front of the first bulkhead wall 71 in the direction of travel. No vent openings 20 are provided in the empty chamber 76. Alternatively, the bulkhead walls 71 begin with the optional wind deflector 72 and the associated vent openings 20 directly at an end side 75 of the heat sink cover 1. An extent of the optional empty chamber 76 along the direction of travel D is, for example, at least 0.1 m or 0.2 m and/or no more than 0.8 m or 0.6 m. Preferably, the empty chamber 76 has its own outlet flap 32 which is opened, for instance, dependent upon a speed of the vehicle, for example, only at relatively high speeds.

Figure 6:
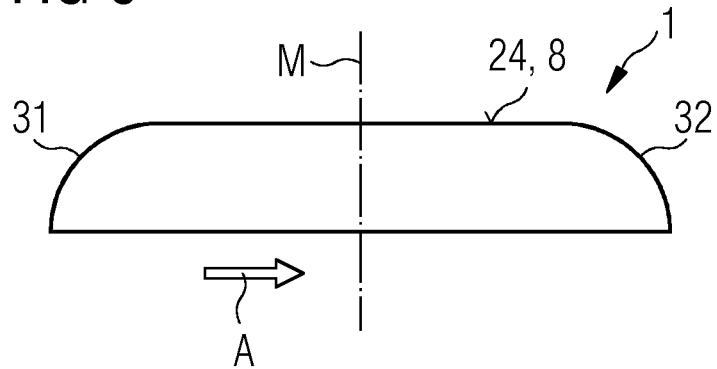
FIGS. 6 to 8 show schematic sectional representations of exemplary embodiments of heat sink covers described herein.

FIG. 6 shows that, seen in cross-section, the housing 1 joins into the roof covering 8 and, in the closed state of the flaps 31, 32, does not alter a profile of the roof covering 8. FIG. 6 also shows that the inlet flap and the outlet flap are oriented symmetrically to a vehicle central axis M.

Figure 7:
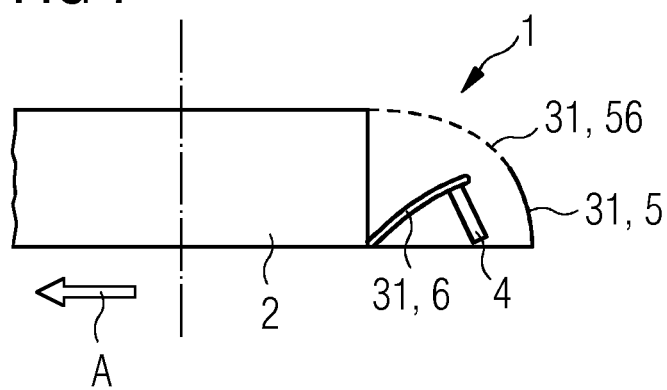

FIG. 7 shows that an opening mechanism 4 of the heat sink cover opens and closes the inlet flap and the outlet flap.

The vehicle 10, which is for example, a high speed train has, for instance, a K4 value in the region of 5 $m^2$. By means of the heat sink cover 1 described herein, the K4 value is reduced by approximately 0.3 $m^2$ as compared with a configuration without such flaps 31, 32. This means that by means of the flaps 31, 32, the K4 value and thus the motion resistance is reducible by approximately 5%. This applies, in particular, at speeds of above 120 km/h.

The components shown in the drawings preferably each follow one another directly if not otherwise indicated, preferably in the sequence given. Layers not touching one another in the drawings are preferably spaced apart from one another. Where lines are drawn parallel to one another, the corresponding surfaces are preferably also oriented parallel to one another. Similarly, if not otherwise indicated, the positions relative to one another of the components shown are correctly reproduced in the drawings.

The invention described here is not restricted by the description on the basis of the exemplary embodiments. Rather, the invention comprises each new feature and each combination of features which includes, in particular, each combination of features in the claims, even if this feature or this combination is not itself explicitly disclosed in the claims or the exemplary embodiments.

LIST OF REFERENCE CHARACTERS

1 Heat sink cover
2 Air throughflow body

20 Vent opening
21 Air intake side
22 Air outflow side
23 Fan
24 Housing root
31 Inlet flap
32 Outlet flap
4 Opening mechanism
5 Lower part of the flaps
56 Upper edge of the lower part
6 Upper part of the flaps
71 Bulkhead wall
72 Wind deflector
73 Transition panel
74 Cover panel
75 End side
76 Empty chamber
8 Roof covering
9 Braking resistor
10 Electrically operated vehicle
11 Vehicle roof
12 Vehicle side surface
A Air throughflow direction
D Direction of travel
M Vehicle central axis

The invention claimed is:

1. An electrically operated vehicle, comprising:
a vehicle roof;
vehicle side surfaces; and
at least one heat sink cover disposed on said vehicle roof, said at least one heat sink cover including:
at least one air throughflow body having an air inflow side, an air outflow side, vent openings and an air throughflow direction transverse to a direction of travel of the vehicle;
at least one inlet flap on said air inflow side and at least one outlet flap on said air outflow side, said at least one inlet flap and said at least one outlet flap having a closed state and an open state;
said at least one inlet flap and said at least one outlet flap being oriented along the direction of travel and obliquely to the air throughflow direction in said closed state;
as seen in a plan view, said at least one inlet flap and said at least one outlet flap together covering said vent openings by at least 90% in said closed state and by at most 60% in said open state;
at least one braking resistor disposed in said at least one air throughflow body;
said vent openings being oriented parallel to said vehicle side surfaces with a tolerance of at most 40°;
said at least one inlet flap and said at least one outlet flap each having a stationary lower part and a movable upper part, said stationary lower part being closer to said vehicle roof than said movable upper part;
said at least one inlet flap and said at least one outlet flap being disposed symmetrically relative to a vehicle central axis, the vehicle central axis being oriented perpendicularly to the direction of travel and vertically; and
said stationary lower parts covering said vent openings by at least 25% and at most 60% as seen in a plan view along the air throughflow direction.

2. The vehicle according to claim 1, which further comprises at least one opening mechanism for opening and closing said at least inlet flap and said at least outlet flap.

3. The vehicle according to claim 1, wherein:
said stationary lower parts have an upper edge facing away from said vehicle roof; and
in said open state, said movable upper parts extend obliquely relative to said vehicle roof as seen in a cross-section perpendicularly to the direction of travel, causing said movable upper parts to each form a ramp in a direction away from said vent openings and toward said upper edge.

4. The vehicle according to claim 1, wherein:
in said open state, said at least one inlet flap and said at least one outlet flap uncover said vent openings by at least 90%, as seen in a plan view along the air throughflow direction; and
said at least one inlet flap and said at least one outlet flap have external surfaces extending parallel to said vehicle roof with a tolerance of no more than 10° in said open state.

5. The vehicle according to claim 1, wherein said heat sink cover has a plurality of transition panels delimiting two sides of said heat sink cover along the direction of travel, said transition panels narrowing continuously in a direction away from said vehicle roof.

6. The vehicle according to claim 1, wherein said heat sink cover has a plurality of cover panels oriented parallel to said vehicle roof with a tolerance of at most 10°, said cover panels extending beyond said vent openings in a direction away from said air throughflow body.

7. The vehicle according to claim 1, which further comprises:
a roof covering;
at least one fan mounted in said air throughflow body for generating an airflow through said air throughflow body for cooling the braking resistor;
at least one of said at least one inlet flap or said at least one outlet flap having external surfaces enclosing an average angle with said vehicle roof of between 20° and 50°, inclusive, and extending flush with said roof covering along the direction of travel, in said closed state; and
the vehicle being an electrically operated train provided for a maximum speed of at least 160 km/h.

8. An electrically operated vehicle, comprising:
a vehicle roof;
vehicle side surfaces; and
at least one heat sink cover disposed on said vehicle roof, said at least one heat sink cover including:
at least one air throughflow body having an air inflow side, an air outflow side, vent openings and an air throughflow direction transverse to a direction of travel of the vehicle;
at least one inlet flap on said air inflow side and at least one outlet flap on said air outflow side, said at least one inlet flap and said at least one outlet flap having a closed state and an open state;
said at least one inlet flap and said at least one outlet flap being oriented along the direction of travel and obliquely to the air throughflow direction in said closed state;
as seen in a plan view, said at least one inlet flap and said at least one outlet flap together covering said vent openings by at least 90% in said closed state and by at most 60% in said open state;
at least one braking resistor disposed in said at least one air throughflow body;
said vent openings being oriented parallel to said vehicle side surfaces with a tolerance of at most 40°;

a plurality of stationary bulkhead walls mounted on said vehicle roof, said bulkhead walls being oriented perpendicularly to the direction of travel with a tolerance of at most 20°;

said bulkhead walls terminating flush with at least a respective one of said inlet flap or said outlet flap in a direction facing away from said air throughflow body;

wind deflectors each mounted on a respective one of said bulkhead walls;

in said closed state of said at least one inlet flap and said at least one outlet flap, said wind deflectors being retracted into or onto a respective bulkhead wall and do not extend beyond at least one of said respective bulkhead wall or said at least one inlet flap and said at least one outlet flap; and in said open state of said at least one inlet flap and said at least one outlet flap, said wind deflectors being extended beyond said respective bulkhead wall.

9. The vehicle according to claim 8, which further comprises at least one opening mechanism for opening and closing said at least inlet flap and said at least outlet flap.

10. The vehicle according to claim 8, wherein said heat sink cover has a plurality of transition panels delimiting two sides of said heat sink cover along the direction of travel, said transition panels narrowing continuously in a direction away from said vehicle roof.

11. The vehicle according to claim 8, wherein said heat sink cover has a plurality of cover panels oriented parallel to said vehicle roof with a tolerance of at most 10°, said cover panels extending beyond said vent openings in a direction away from said air throughflow body.

12. The vehicle according to claim 8, which further comprises:

a roof covering;

at least one fan mounted in said air throughflow body for generating an airflow through said air throughflow body for cooling the braking resistor;

at least one of said at least one inlet flap or said at least one outlet flap having external surfaces enclosing an average angle with said vehicle roof of between 20° and 50°, inclusive, and extending flush with said roof covering along the direction of travel, in said closed state; and the vehicle being an electrically operated train provided for a maximum speed of at least 160 km/h.

\* \* \* \* \*